United States Patent [19]
[11] 3,763,478
[45] Oct. 2, 1973
Yoshizawa et al.

[54] DRIVING SYSTEM IN MAGNETIC SINGLE WALL DOMAIN DEVICE

[75] Inventors: Shigeru Yoshizawa; Itsuo Mikami, both of Kodaira-shi; Gen-ichi Kamoshita, Kodaira; Nobuo Saito, Mitaka, all of Japan

[73] Assignee: Hitachi, Ltd., Tokyo, Japan

[22] Filed: June 27, 1972

[21] Appl. No.: 266,632

[30] Foreign Application Priority Data

June 30, 1971 Japan .............................. 46/48334

[52] U.S. Cl....... 340/174 TB, 340/174 TF, 307/254, 307/270, 328/113, 328/223, 340/174 SR

[51] Int. Cl......................... G11c 11/14, G11c 19/00

[58] Field of Search................ 340/174 TF, 174 SR, 340/174 TB; 307/254, 270; 328/113, 223

[56] References Cited

UNITED STATES PATENTS

| | | | |
|---|---|---|---|
| 3,577,131 | 5/1971 | Marrow et al. | 340/174 TF |
| 3,673,433 | 6/1972 | Kupfer | 328/223 |
| 3,516,077 | 6/1970 | Bobeck et al. | 340/174 TF |

*Primary Examiner*—Stanley M. Urynowicz, Jr.
*Attorney*—Paul M. Craig et al.

[57] ABSTRACT

In a magnetic domain device in which T-bar patterns made of permalloy, etc. are formed on a magnetic film for producing magnetic single wall domains and a rotating magnetic field is generated in said magetic film to transfer a magnetic domain, a driving system includes the connections of resonating capacitors and X and Y coils for forming a rotating magnetic field. The driving power for the device is much reduced by resonating the circuits comprising the coils and the capacitor at the frequency of the power source.

5 Claims, 17 Drawing Figures

DRIVING SYSTEM IN MAGNETIC SINGLE WALL DOMAIN DEVICE

BACKGROUND OF THE INVENTION

1. Field of the Invention

This invention relates to a magnetic single wall domain device in which T-bar or Y-bar patterns made of ferromagnetic film, e.g. permalloy, are formed on a magnetic film for generating magnetic single wall domains and a rotating magnetic field is formed in the plane of the magnetid film to transfer the magnetic domains in the magnetic film, and more particularly to a rotating field driving system which allows sine and cosine wave currents to flow through the orthogonal X and Y coils to generate a rotating magnetic field.

Here, the term "T-bar pattern" represents a regularly alternating disposition or array of T-shaped and bar-shaped patterns, and the term "Y-bar pattern" represents a regularly alternating disposition or array of Y-shaped and bar-shaped patterns.

2. Description of the Prior Art Form

In a magnetic single wall domain device, a plane is made by forming a pattern of T-bar, etc. made of permalloy, etc. on a magnetic film having a dimension of the order of 2.5 cm square, or by forming a T-bar pattern made of permalloy on an insulating plate, e.g. ceramic, having a dimension of the order of 5 cm square and disposing a multiplicity of small magnetic films of 2 to 10 mm square thereon. Several of these planes are superposed to form a stack of substantially cubic shape. Coils are wound around this stack to establish magnetic fields in X, Y, and Z directions. The Z magnetic field is used as a bias field and set at a constant value appropriate to generate a single wall domain. The Z coil may be substituted by a permanent magnet. In the X and Y directions, sinusoidally varying magnetic fields having a phase difference of 90° from each other are applied to form a rotating magnetic field in the magnetic film surface which generate a single wall domain and appropriately magnetize the T-bar patterns to propagate the single wall domain.

Here, the energy of the static magnetic field is proportional to the volume of the tack and the impedance of the coils for generating a rotating field is proportional to the frequency of the rotating magnetic field. Therefore, there should be a limitation for driving a large volume stack at a high rotating frequency.

For example, when a uniform field H is established in a cubic space having a side length $a$ and this magnetic flux is generated by a coil of N windings, $$E = Nd\Phi/dt = N\, a^2\, dB/dt \qquad (1)$$

where $E$ is the voltage established across the coil, $\Phi$ is the total magnetic flux, and $B$ is the magnetic flux density.

Letting the coil current be $I$ and provided that all of the magneto-motive force $NI$ applies to this cubic space, $$NI = H \cdot a \qquad (2)$$

$$B = \mu_o H \qquad (3)$$

where $\mu_o$ is the permeability of vacuum. From equations (1) to (3), $$E = (H \cdot a/I) \cdot a^2 \cdot \mu_o\, (dH/dt) \qquad (5)$$

When $$H = H_R \sin \omega t$$
$$I = I_R \sin \omega t \qquad (6)$$
$$E = E_R \sin \omega t$$

then equation (5) becomes $$E_R \cdot I_R = \mu_o a^3 \omega H_R^2 \qquad (7)$$

This means that the product of the peak values of the coil current and the voltage is proportional to the volume in which the magnetic field is established, angular frequency and the square of the magnetic field intensity.

In the case of driving such an inductance load by a push-pull amplifier of class B, when a voltage $E_R$ is applied as the operating source voltage of the amplifier and a current having an average value of $2I_R/\pi$ flows, the power consumption is $$P_t = 2E_R \cdot I_R/\pi \qquad (8)$$

Since the load is a pure reactance, this power is wholly consumed in the driving transistor.

As a result of analysis, a memory having a capacity of 32 M bit can be formed using a garnet in which a magnetic domain of 5 $\mu$m in diameter may be produced and under the conditions of $H_R = 20\ O_e = 1.6 \times 10^3$ $AT/m$, $a = 4$ cm $= 4 \times 10^{-2}$ $m$. *Putting these values into equations* (7) and (8) with the use of frequency of 1 $MH_z$, $$P_t = 930\ W \qquad (9)$$

Thus, the driving circuit should become larger and consume power of 54 $\mu W$/bit.

SUMMARY OF THE INVENTION

Accordingly, an object of the invention is to provide a remarkable reduction in power consumption of a driving circuit in a magnetic domain device by connecting capacitors with the coils for producing a rotating field so as to form resonance circuits therewith.

Another object of the invention is to provide a driving system for a magnetic domain device which does not cause uncertain propagation of a single wall domain at the beginning and the end of the rotation of the magnetic field.

Further object of the invention is to provide a driving system for a magnetic domain device capable of stopping the rotating field at an arbitrarily determined phase angle, retaining the magnetic field as it is and restarting the rotation from the same phase angle.

Other objects, features and advantages of the invention will be apparent from the following detailed description when read in conjunction with the accompanying drawings.

DESCRIPTION OF THE PREFERRED EMBODIMENTS

Figure 1:
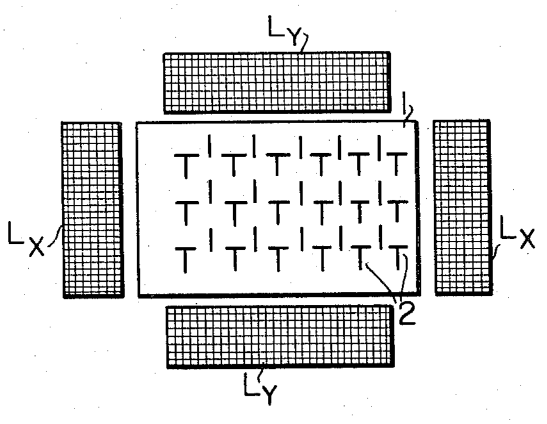
FIG. 1 is a schematic diagram of a magnetic single wall domain device.
Figure 2:
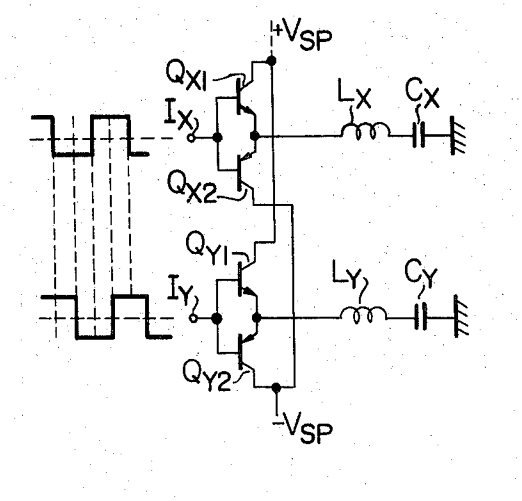
FIG. 2 is a circuit diagram of an embodiment of a driving circuit according to the invention.

Referring to FIGS. 1 and 2 which show an embodiment of the invention, a single wall domain device 1 is formed of the superposition of several planes each of which is formed by adhering T-bar patterns 2 of permalloy on a thin film of, e.g. orthoferrite. Coils $L_X$ and $L_Y$ generate magnetic fields in X and Y directions in the plane of said device, respectively. Resonance capacitors $C_X$ $C_Y$ are connected in series to these coils $L_X$ and $L_Y$, respectively. An alternating voltage is supplied from a complementary emitter follower circuit consisting of transistors $Q_{X1}$ and $Q_{X2}$ to the series connection of the coil $L_X$ and the capacitor $C_X$ and another alternating voltage having a phase $\pi/2$ different from that of said voltage is supplied from a complementary emitter follower circuit consisting of transistors $Q_{Y1}$ and $Q_{Y2}$ to the series connection of the coil $L_Y$ and the capacitor $C_Y$.

In order to supply such alternating voltages to the respective series circuits, a rectangular wave signal as shown in FIG. 2 is applied to the bases of the transistors $Q_{X1}$ and $Q_{X2}$ and a rectangular wave signal having a phase $\pi/2$ shifted from that of the former voltage is applied to the bases of the transistors $Q_{Y1}$ and $Q_{Y2}$. The collectors of the transistors $Q_{X1}$ and $Q_{Y1}$ are commonly connected to the positive terminal of an operating power source $V_{SP}$, whereas the collectors of the transistors $Q_{X2}$ and $Q_{Y2}$ are commonly connected to the negative terminal of the operating power source $V_{SP}$. The power consumption in these transistors $Q_{X1}$, $Q_{X2}$, $Q_{Y1}$ and $Q_{Y2}$ can be reduced by on-off operating these transistors between the saturated region and the cut-off region. Further, the amplitude of the voltages supplied to the loads of the respective complementary emitter follower circuits is uniquely determined and stabilized by the voltage of the operating power source $V_{SP}$. When coils for generating a rotating field and respective capacitors C resonating at the frequency of the rotating field are connected in series and such series circuits are to be driven as is described above, the power consumption reduces to $$P_l' = 930/Q = 9.3\ W \tag{10}$$

where $Q$ is the $Q$-value of the series resonance circuits and is assumed to be $Q = 100$. This is due to the reduction of the load impedance to $1/Q$ and hence the reduction of the required source voltage to $1/Q$. Further, since the driving circuit is purely resistive, it consumes only $$P_d = (4 - \pi/4)\ P_l' = 2\ W \tag{11}$$

Remainder of the power of 7.3 *W* is consumed in the coils. Namely, the power consumption of a driving circuit reduces to about 1/500 when a coil is resonated with a capacitor and arranged to have a Q-value of 100, compared with the case of directly driving the coil. Thus, the formation of a resonance circuit is very useful for the simplification and the cost-down of a circuit. Similar effects can also be obtained by the use of parallel resonance circuits. Further, since a resonance circuit has a function of a filter, an auxiliary advantage is provided that the driving waveform for a series or parallel circuit needs not be sinusoidal, and the coil current becomes sinusoidal if the driving waveform is a periodic wave, e.g. rectangular wave, saw-tooth wave, which does not include any d.c. component.

Figure 3:
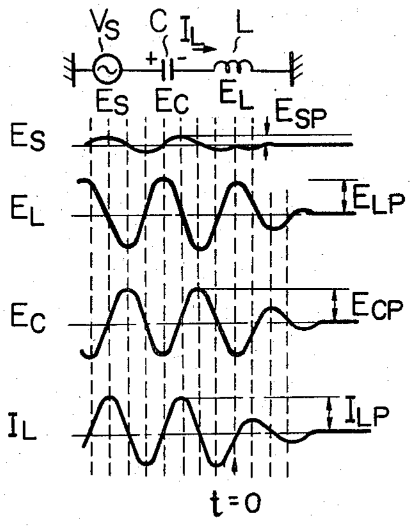
FIGS. 3, 4 and 5 show a series resonance circuit and waveforms at various points of the series resonance circuit when connected to or disconnected from a voltage or a current source.

It is sometimes desirable in a certain type of magnetic single wall domain device that the rotating magnetic field in the plane of the device is applied only by an arbitrarily determined number of cycles and is not applied in other periods. For example in a large capacity memory, it is desirable from the views of cost and reduction in power consumption of a driving circuit that a stack is divided into a plurality of substacks whereby only one substack can be selectively driven by the driving circuit. In such a case, it is desired that the rotating magnetic field in the plane is applied at the time of write-in and read-out but is not applied in other durations. However, ambiquous propagation of a single wall domain should not be caused at the beginning or end of the rotation of the field in the plane, thus the driving sinusoidal waves should be free from a damping oscillation or an exponential shift of the d.c. level at the beginning or end and should perform beginning or ending with the same waveform as that in the continuous rotation. Generally, when a sinusoidal current gated at a certain phase is applied to a series or parallel resonance circuit, said advantage of causing resonance cannot be obtained. For example, a case will be considered in which a series resonance circuit consisting of a coil L and a capacitor C is driven by a voltage source $V_S$ as is shown in FIG. 3. The current $I_L$ flowing through this series circuit in a steady state is a sinusoidal current having a peak value of $I_{LP}$. The voltages $E_L$ and $E_C$ established across the coil L and the capacitor C become of opposite phase and have approximately equal peak values $E_{LP}$ and $E_{CP}$ ($E_{LP} \approx E_{CP}$) as is shown in the figure. The small difference of said voltages $E_{LP}$ and $E_{CP}$ becomes equal to the peak value $E_{SP}$ of the sinusoidal voltage $E_S$ of the power source $V_S$. As is well known, if the Q-value of said series resonance circuit is $Q = 100$, $E_{LP} \approx 100 \times E_{SP}$. When the source voltage $E_S$ is set to zero after $t = 0$, an oscillating current as shown in the figure flows through the resonance circuit after $t = 0$ since a voltage of $E_{CP}$ is charged between the electrodes of the capacitor C at $t = 0$. If the source voltage is set to zero at the point of $E_C = 0$, a current of $I_L = I_{LP}$ flows through the coil L at that moment and thus an oscillating current also flows by this current. Namely, there is no phase at which both of $E_C = 0$ and $I_L = 0$ are satisfied. Therefore, it is inevitable that an oscillating current is allowed to flow even after the cut-off of the source voltage. Such an oscillating current induces ambiguous propagation of a magnetic domain even after the stopping of application of the rotating magnetic field and becomes a cause for generating misoperation.

Figure 4:
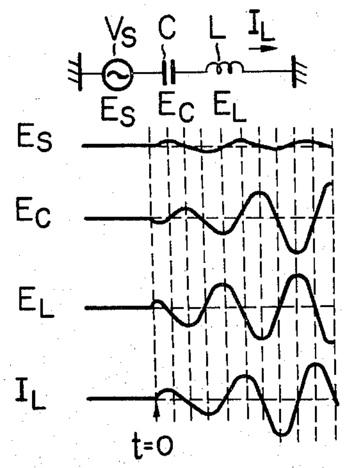

FIG. 4 shows the variation of the voltages $E_L$ and $E_C$ of the coil L and the capacitor C and the coil current $I_L$ in a series resonance circuit, which is the same as that of FIG. 3, after the application of a source voltage $E_S$. In this case, since initially $E_C = 0$ and $I_L = 0$, the voltage of $E_{LP}$ does not apply to the coil L for a certain time length and the current allowed to flow is also small. The capacitor is charged little by little and reaches a steady state after several periods. Until a steady state is realized, a gradually growing oscillating current is allowed to flow and may cause ambiguous propagation of a magnetic domain similar to the case described in connection with FIG. 3.

Figure 5:
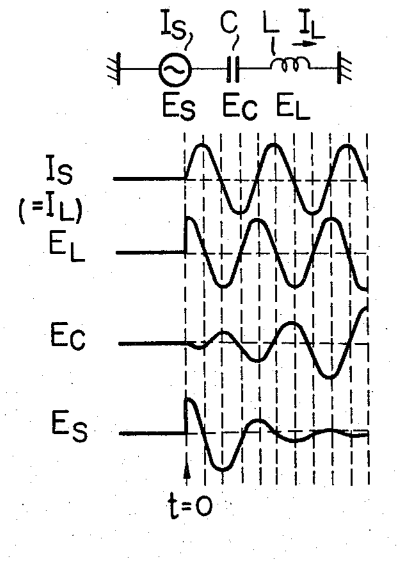

FIG. 5 shows variations of voltages extending across the coil and the capacitor and the coil current in the case of driving a series resonance circuit consisting of a coil L and a capacitor C by a current source $I_S$ ($I_S$ also represents the current value). In this case, the current waveform through the coil L is equal to that of steady state from the beginning, but since the voltage $E_C$ across the capacitor C is equal to zero at the beginning ($t = 0$) of current flow, the coil voltage $E_L$ directly appears across the power source $I_S$. The terminal voltage of this power source $I_S$ is gradually decreased in magnitude and reaches a constant value after several cycles. In such an arrangement, the current source $I_S$ should be designed to endure against a load voltage which is Q times as large as that in the steady state. Then, the advantages of the use of resonance is lost. Further in FIG. 5, when the current supply is stopped at the phase of $I_L = 0$ to stop the rotating field, said current $I_L$ is normally cut off but the voltage charged in the capacitor C directly appears at the power source.

Figure 6:
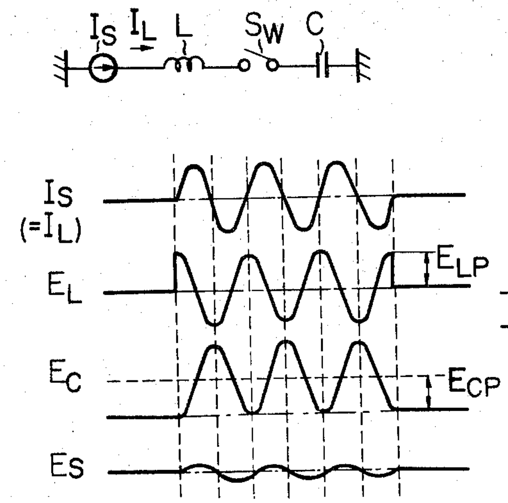
FIGS. 6 and 7 are circuit diagrams of a series and a parallel resonance circuits and the waveforms at various points of the circuits for illustrating the principle of the invention.

Then, another case will be considered in which a circuit including a switch SW between a capacitor C and a coil L is driven by a current source $I_S$ as is shown in FIG. 6. At the beginning of the current supply, a voltage of $-E_{CP}$ is preliminarily charged in the capacitor C and a sine wave current beginning from the phase of $I_S = 0$ is allowed to flow and simultaneously the switch SW is closed. Such initial conditions are equal to those in the steady state, and thereby voltage and current waveforms equal to those in the steady state are realized even immediately after the start of the current supply. At the end, if the switch SW is opened simultaneously with the cut-off of the current from the current source $I_S$ at the phase of zero amplitude, correct waveforms are realized similarly.

Figure 7:
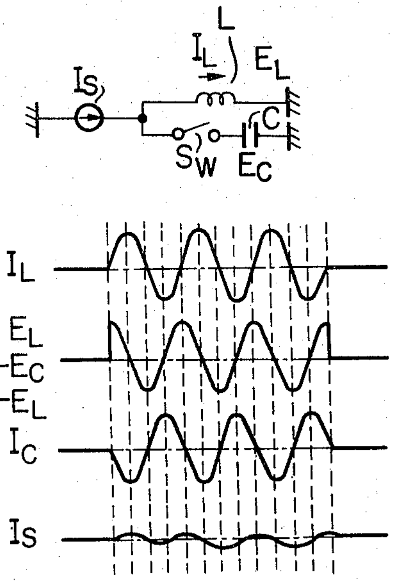

FIG. 7 shows an example of a parallel resonance circuit, in which a charged capacitor C is connected at the beginning and separated at the end of the rotation of the field.

A magnetic single wall domain device operates at the frequency of several 10's of KHz to several MHz, and this switch SW cannot achieve the purpose unless it operates in a time less than one-tenth of the operating period of said device. An electronic switch such as a transistor switch can easily satisfy this requirement.

Figure 8:
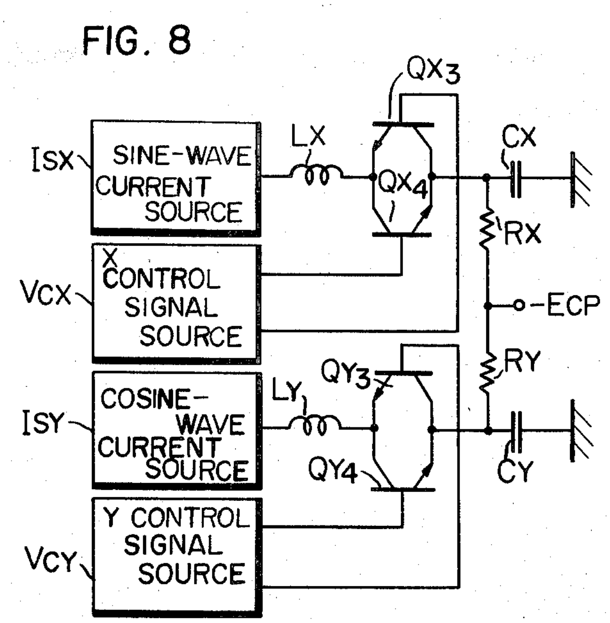
FIG. 8 is a circuit diagram of another embodiment of the invention.

FIG. 8 shows an embodiment of the invention based on the principle illustrated in FIG. 6.

In the figure, a switch consisting of transistors $Q_{X3}$ and $Q_{X4}$ is connected between X coil $L_X$ and a resonating capacitor $C_X$, and another switch consisting of transistors $Q_{Y3}$ and $Q_{Y4}$ is con-nected between Y coil $L_Y$ and a resonating capacitor $C_Y$. A control signal from a X control signal source $V_{CX}$ is applied to the bases of said transistors $Q_{X3}$ and $Q_{X4}$, and another control signal from a Y control signal source $V_{CY}$ is applied to the bases of said transistors $Q_{Y3}$ and $Q_{Y4}$. Said X and Y coils $L_X$ and $L_Y$ are connected to a sine and a cosine current sources $I_{SX}$ and $I_{SY}$, respectively. Further, the resonating capacitors $C_X$ and $C_Y$ are connected to a d.c. source (not shown) through high resistances $R_X$ and $R_Y$, the d.c. source having a value equal to the peak voltage $E_{CP}$ between the electrodes of the capacitor in the stationary state.

In such a circuit, transistors $Q_{X3}$, $Q_{X4}$, $Q_{Y3}$ and $Q_{Y4}$ are controlled to turn on only at the time of propagation of a magnetic domain. When the switch is opened, since the voltage $E_{CP}$ is charged in the resonating capacitors $C_X$ and $C_Y$ as is stated above, the current and voltage waveforms of the series resonating circuit becomes same as those in the steady state immediately after the turning-on of the switch.

Further in a certain kind of magnetic single wall domain device, it may be desirable that the field in a plane rotates not only in one direction but also in opposite direction. For example, if a T-bar pattern of permalloy is modified, the propagation path of a magnetic domain can be exchanged by reversing the magnetic field in a plane. Memory operations such as reading and writing can be done utilizing the above fact.

Figure 9:
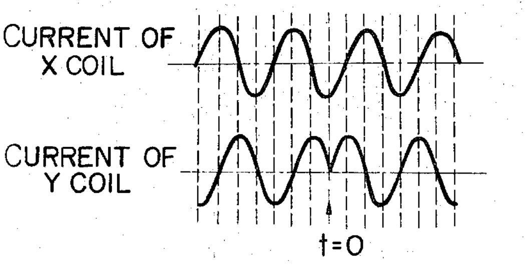
FIGS. 9 and 11 show the waveforms of coil currents in the case of reversing the rotating field.
Figure 10:
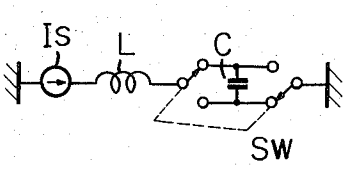
FIG. 10 is a schematic circuit diagram for explaining the principle of the invention in the case of reversing the rotating field.
Figure 11:
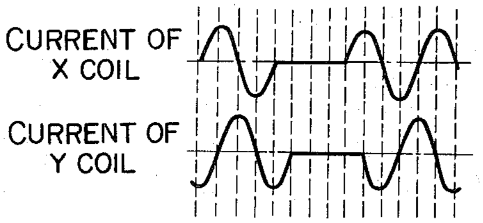

For reversing the rotating field, the X coil current is let to flow and the polarity of the Y coil current is reversed at $t = 0$ as is shown in FIG. 9. Here, it is required that the polarity is reversed while the current keeps the correct waveform. If the waveform is distorted, ambiguous propagation of a magnetic domain may occur. In a circuit including a serially or parallelly connected capacitor, it is apparent that the waveforms as shown in FIG. 9 cannot be obtained simply by reversing the polarity of the waveform in the driving circuit, due to the energy stored in the coil or the capacitor. However, it is also apparent from the description on FIG. 6 that if the capacitor C is connected in reverse polarity simultaneously with the reversal of the driving waveform by use of an electronic switch SW as is shown in FIG. 10, initial conditions are satisfied and the waveforms of FIG. 9 can be obtained. In FIG. 10, another capacitor charged in opposite polarity may be used and the circuit may be connected alternately between the two capacitors. Further, as is shown in FIG. 11, the X and Y coil currents may be cut off once and after reversely reconnecting the capacitor can be allowed to flow. Then, the reversed magnetic field is obtained. It is also apparent that similar circuits as that of FIG. 10 can be formed using a parallel resonance circuit.

Figure 12:
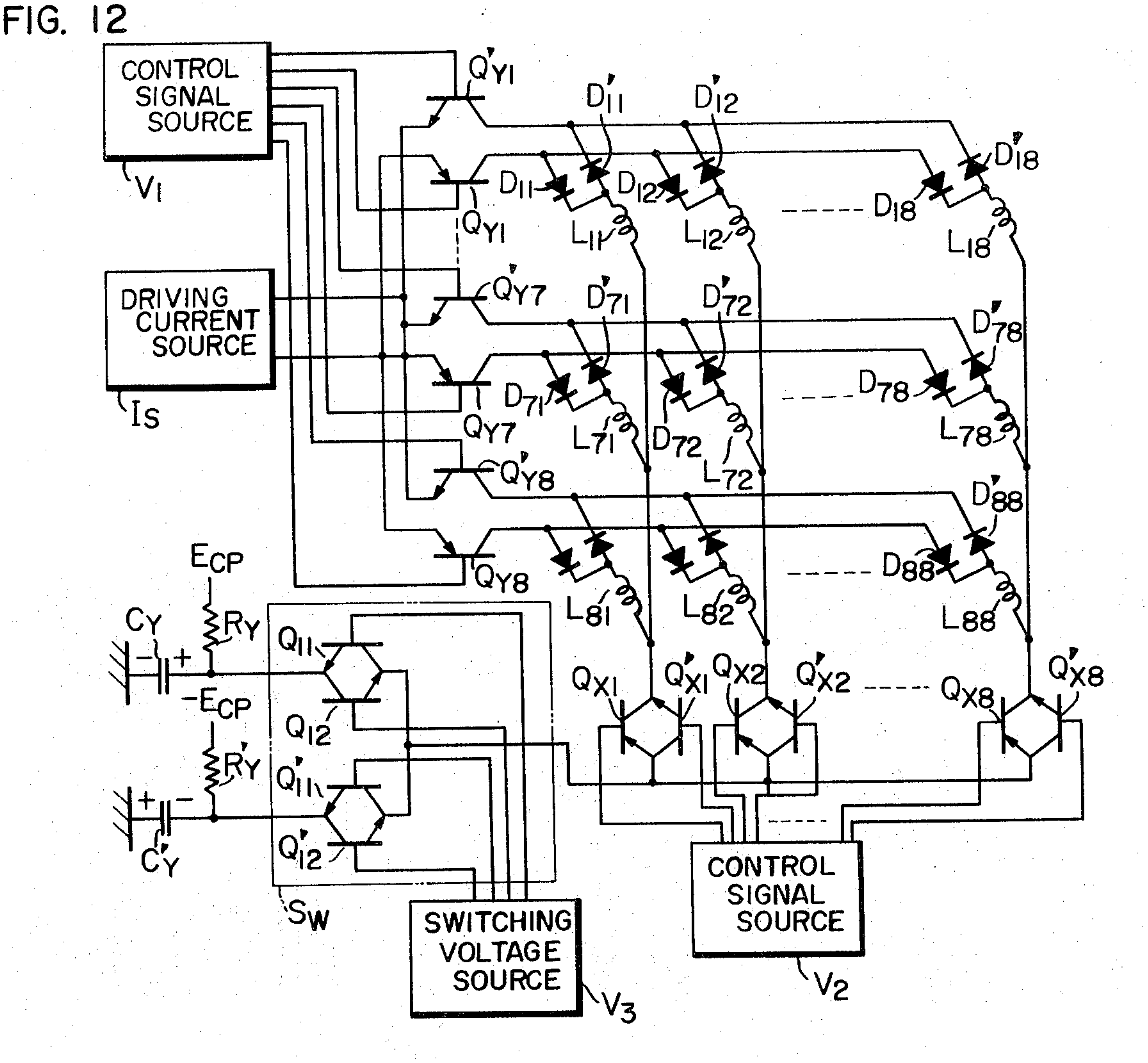
FIG. 12 is a circuit diagram of another embodiment of the invention.

FIG. 12 is an embodiment of a driving circuit in which the magnetic field in the plane of a magnetic domain device can be reversely rotated by controlling the coil currents as shown in FIG. 9. In this embodiment, the magnetic domain device is divided into 64 substacks which are driven by 64 coils. In the figure, only the driving circuit for the Y coils is shown. A similar circuit is provided to the X coils except the absence of the reversing circuit for this case.

In the figure, references $L_{11}$, $L_{12}$, ... $L_{18}$, $L_{21}$, ... $L_{87}$, $L_{88}$ represent Y coils corresponding to the respective 64 substacks, which are formed in matrix shape. The first row coils $L_{11}$ to $L_{18}$ are connected to the collectors of switching transistors $Q_{Y1}$ and $Q_{Y1}'$ through reversely connected diodes $D_{11}$ to $D_{18}$ and $D_{11}'$ to $D_{18}'$. Similarly, the n-th row coils $L_{n1}$ to $L_{n8}$ are connected to the collectors of the switching transistor $Q_{Yn}$ and $Q_{Yn}'$ through reversely connected diodes $D_{n1}$ to $D_{n8}$ and $D_{n1}'$ to $D_{n8}'$. The emitters of said transistors $Q_{Y1}$ to $Q_{Y8}$ and $Q_{Y1}'$ to $Q_{Y8}'$ are respectively connected to the driving current source $I_S$. To the bases of the respective transistors, signals from a control signal source $V_1$ are applied and a switching transistor is selectively turned on by said signal.

The n-th column coils $L_{1n}$ to $L_{8n}$ are connected to a switching circuit SW for reversing the phase of a current flowing through the Y coil, through the switching transistors $Q_{Xn}$ and $Q_{Xn}'$. This switching circuit SW consists of switching transistors $Q_{11}$ and $Q_{12}$ for allowing a current flowing from a driving current source $I_S$ through the Y coil to flow through a resonating capacitor $C_Y$, and switching transistors $Q_{11}'$ and Q $_{12}'$ for allowing the current through a resonating capacitor $C_Y'$. These switching transistors $Q_{11}$, $Q_{12}$, $Q_{11}'$ and $Q_{12}'$ are selectively on-off controlled by a signal from a switching voltage source $V_3$. The capacitor $C_Y$ is connected to the positive terminal of the source $E_{CP}$ through a high resistance $R_Y$ and the other capacitor $C_Y'$ is connected to the negative terminal of the source $E_{CP}$ through a high resistance $R_Y'$.

In such an arrangement, activation of, e.g. a coil $L_{88}$ will be described. In this case, transistors $Q_{Y8}$ and $Q_{Y8}'$ are selected and turned on by a signal from the control signal source $V_1$, and simultaneously transistors $Q_{X8}$ and $Q_{X8}'$ are selectively turned on by the signal from the control signal source $V_2$. Further in the case of positively rotating the rotation field, transistors $Q_{11}$ and $-_{12}$ are turned on and transistors $Q_{11}'$ and $Q_{12}'$ are cut off by the signal from the swtiching voltage source $V_3$. Thus, a current from the driving current source $I_S$ is allowed to flow through transistors $Q_{Y8}$, $Q_{Y8}'$ ... diodes $D_{88}$, $D_{88}'$ ... coil $L_{88}$ ... transistors $Q_{X8}$, $Q_{X8}'$ ... transistors $Q_{11}$, $Q_{12}$ ... capacitor $C_Y$ ... to ground.

In reversing the rotation field, the transistors $Q_{11}'$ and $Q_{12}'$ are turned on and the transistors $Q_{11}$ and $Q_{12}$ are turned off. Thus, a current from the driving source $I_S$ is allowed to flow through transistors $Q_{Y8}$ and $Q_{Y8}'$ ... diodes $D_{88}$, $D_{88}'$ ... coil $L_{88}$ ... transistors $Q_{X8}$, $Q_{X8}'$ ... transistors $Q_{11}'$, $Q_{12}'$ ... capacitor $C_Y'$ ... and ground. In this case, since the capacitor $C_Y'$ is charged with a voltage of the same value as but of the opposite polarity to the charging voltage $V_{CP}$ in the stationary operation, the current waveform allowed to flow through the Y coil $L_{88}$ when the transistor switch SW is changed takes a regular form as in the stationary operation and thus the phase is reversed as shown in FIG. 9.

Figure 13A:
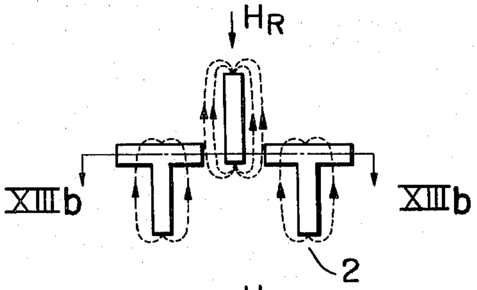
FIG. 13*a* is a plan view of a magnetic flux distribution around a magnetic film pattern in a magnetic domain device.
Figure 13B:
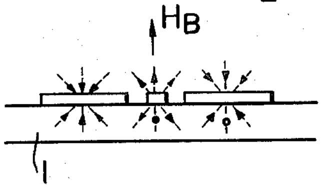
FIG. 13*b* is a cross sectional view of the magnetic flux distribution of FIG. 13*a* along line XIII*b*—*XIIIb*.

In a certain kind of magnetic single wall domain device, it is sometimes desirable that the magnetic field is stopped rotating at an arbitrarily determined phase, and is applied as it is till the re-rotation of the field and begins to re-rotate from the same phase. As is shown in FIGS. 13*a* and 13*b*, when the magnetic field in a plane magnetizes the T-bar patterns made of permalloy, a vertical magnetic field component is generated and thus the total bias magnetic field is locally decreased and/or increased. In the figure, numeral 1 indicates a magnetic plane for a circular single wall magnetic domain, 2 T-bar patterns made of permalloy. The circular single wall magnetic domain takes a stable state at which the bias magnetic field is low. Thus, when the magnetic field in a plane is reduced to zero at the end of rotation, the effective bias magnetic field for the circular single wall magnetic domain becomes different and the operational margin may become narrower. When it is desired to stop the rotating magnetic field at a phase where the current is not zero, cutting the current at the desired moment will generate a large coil voltage and may break the circuit or cause other unstable operation. In such a case, if the current flowing through the coil at the phase where the rotation of the field is stopped is continuously allowed to flow by a circuit as shown in FIG. 15 and re-opens rotation from the same phase in re-opening the rotation as is shown in FIG. 14, initial conditions and a condition of applying a field in the plane also in the resting period are satisfied.

Figures 14, 15:
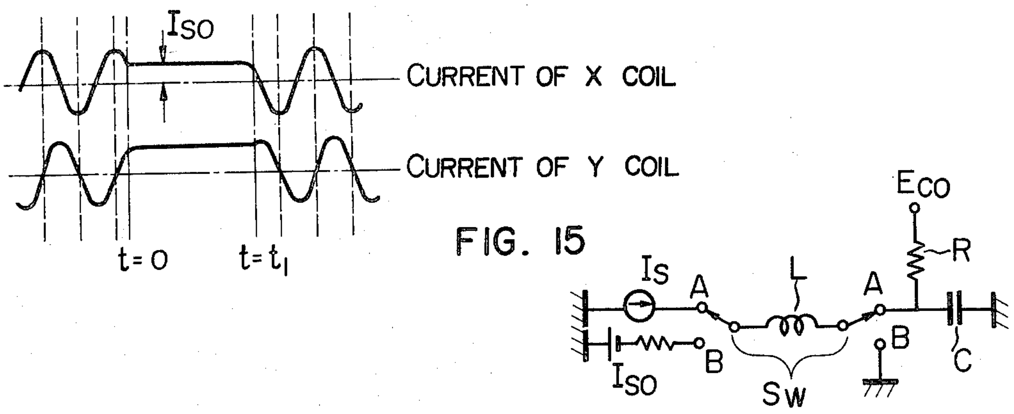
FIG. 14 shows the waveforms of coil currents when the rotating magnetic field is retained for a certain period of time.
FIG. 15 is a circuit diagram for allowing a current of FIG. 14 to flow.

In the circuit of FIG. 15, an electronic switch SW occupying position A so that a current is supplied from a current source $I_S$ to a coil L and capacitor C is changed to position B at $t = 0$ so that a current $I_{S0}$ which is equal to the current flowing at the moment is allowed to flow now from a d.c. source and a voltage equal to the voltage applied to the capacitor C at the moment is applied now from a voltage source $E_{C0}$ through a high resistance R to prevent the discharge of the capacitor C. At the time of restarting the rotation, the switch SW is changed to the position A and the current is supplied from the current source $I_S$ again. By the above arrangement, there are provided such advantages that resonance is achieved, that the rotation can be stopped at an arbitrary phase, that the magnetic field in the plane is applied also in the resting period, and that the operational margin is wide. It is apparent that this can be also achieved with a parallel circuit.

Here, the current waveforms for driving said series or parallel circuit is not necessarily sinusoidal, but may also be any periodic shape provided that no d.c. component is included.

Figure 16:
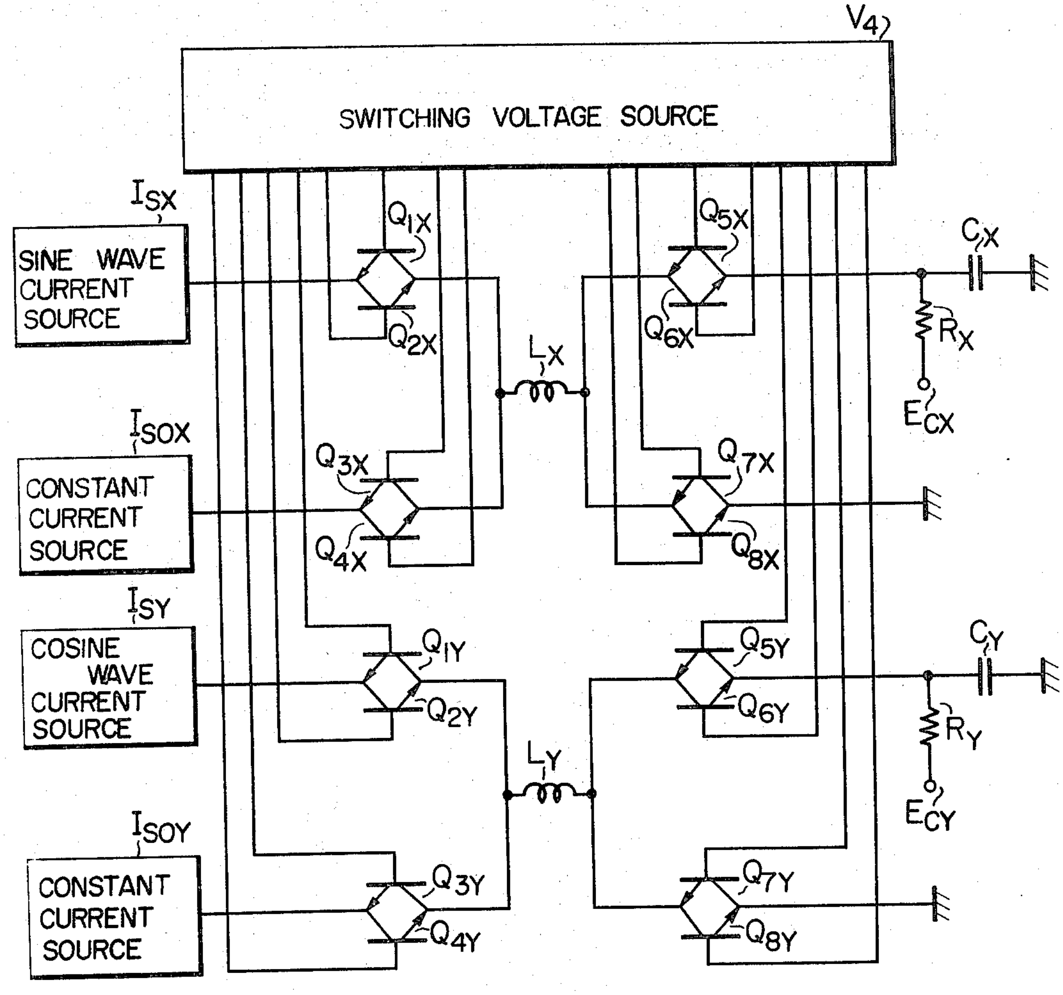
FIG. 16 is a circuit diagram of another embodiment of the invention.

FIG. 16 shows another embodiment of the invention based on the principle shown in FIG. 15.

In the figure, one end of an X coil $L_X$ is connected through a switch consisting of transistors $Q_{1X}$ and $Q_{2X}$ to a sine wave current source $I_{SX}$, and also through a switch consisting of transistors $Q_{3X}$ and $Q_{4X}$ to a d.c. constant current source $I_{S0X}$. The other end of the X coil $L_X$ is connected through a switch consisting of transistors $Q_{5X}$ and $Q_{6X}$ to a resonating capacitor $C_X$, and also through a switch consisting of transistors $Q_{7X}$ and $Q_{8X}$ to the ground. Said capacitor $C_X$ is connected to a voltage source $E_{CX}$ through a high resistance $R_X$.

Similar arrangement is also formed for a Y coil $L_Y$; one end of the Y coil $L_Y$ is connected through transistors $Q_{1Y}$ and $Q_{2Y}$ to a cosine wave current source $I_{SY}$ and also through transistors $Q_{3Y}$ and $Q_{4Y}$ to a d.c. constant current source $I_{S0Y}$, and the other end of said coil $L_Y$ is connected through transistors $Q_{5Y}$ and $Q_{6Y}$ to a resonating capacitor $C_Y$ and also through transistors $Q_{7Y}$ and $Q_{8Y}$ to the ground. A capacitor $C_Y$ is connected to a d.c. voltage source $E_{CY}$ through a high resistance $R_Y$. The actions of the respective switches $Q_{1X}$ to $Q_{8X}$ and $Q_{1Y}$ to $Q_{8Y}$ are controlled by the voltages from a switching voltage source $V_4$.

In the case of allowing currents for forming a rotating field to flow through the X and Y coils $L_X$ and $L_Y$, the switching voltage source $V_4$ bring the transistors $Q_{1X}$, $Q_{2X}$, $Q_{5X}$, $Q_{6X}$ and $Q_{1Y}$, $Q_{2Y}$, $Q_{5Y}$ and $Q_{6Y}$ into "on" state by the controlled voltages. Then, a sine wave current flows through the coil $L_X$ and a cosine wave current flows through the coil $L_Y$.

In the case of stopping rotation, the switching voltage source $V_4$ is so controlled that said respective transistors are turned off and the transistors $Q_{3X}$, $Q_{4X}$, $Q_{7X}$, $Q_{8X}$, and $Q_{3Y}$, $Q_{4Y}$, $Q_{7Y}$ and $Q_{8Y}$ are turned on. Thus, constant currents are supplied to the coils $L_X$ and $L_Y$ and currents similar to those of FIG. 14 are allowed to flow.

As is apparent from the above description, this invention provides remarkable effects that the driving power for a magnetic single wall domain device is much reduced and that ambiguous propagation of a magnetic domain at the time of starting, reversing and stopping the rotating field can be prevented.

We claim:

1. A magnetic domain driving system of resonating coil type comprising:

a magnetic domain device made by forming a ferromagnetic film pattern on a magnetic film for generating a magnetic single wall domain;

X and Y coils for generating a rotating field in the plane of said magnetic film by supplying sine and cosine currents thereto;

a capacitor connected to each of said X and Y coils for forming a resonance circuit with said coil at the frequency of the rotating magnetic field; and current sources for supplying a periodic current including no d.c. component to each of the resonance circuits consisting of said coil and said capacitor.

2. A magnetic domain driving system of resonating coil type according to claim 1, further comprising:

a switch capable of performing on-off operation at the time when the periodic current flowing through said coil becomes zero, connected between said coil and said capacitor; and means for retaining the terminal voltage of said capacitor immediately before the opening of said switch during the period when the switch is opened.

3. A magnetic domain driving system of resonating coil type according to claim 1, further comprising:

switching means for reversing the current flowing through one of said coils at the time when the periodic current becomes zero; and switching means for re-connecting the capacitor connected to the coil in reversed polarity at the time of reversal.

4. A magnetic domain driving system of resonating coil type according to claim 1, further comprising:

switching means for reversing the polarity of the current flowing through one coil at the time when said current becomes zero; and switching means for isolating the capacitor connected to the coil and connecting another capacitor charged in opposite polarity at the time of reversal.

5. A magnetic domain driving system of resonating coil type according to claim 1, further comprising:

d.c. current sources for stopping the rotating magnetic field at an arbitrary phase and allowing currents having the same value as those flowing through the respective coils at this moment to flow through the respective coils;

switching means for isolating the capacitor at said moment; and means for retaining the terminal voltage of the capacitor immediately before said stopping of the rotating field till the time of re-starting the rotation.

* * * * *